US007133040B1

(12) United States Patent
Abdallah et al.

(10) Patent No.: US 7,133,040 B1
(45) Date of Patent: *Nov. 7, 2006

(54) SYSTEM AND METHOD FOR PERFORMING AN INSERT-EXTRACT INSTRUCTION

(75) Inventors: Mohammad Abdallah, Folsom, CA (US); Srinivas Chennupaty, Portland, OR (US); Robert S. Dreyer, Palo Alto, CA (US); Michael A. Julier, Santa Clara, CA (US); Katherine Kong, Fair Oaks, CA (US); Larry Mennemeier, Boulder Creek, CA (US); Ticky S. Thakkar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/053,006

(22) Filed: Mar. 31, 1998

(51) Int. Cl.
*G06T 15/00* (2006.01)

(52) U.S. Cl. .................. 345/419; 345/501; 345/502; 345/520; 345/530; 708/607; 708/622; 712/210; 712/300; 712/225

(58) Field of Classification Search ............ 345/419, 345/501, 502, 520, 530, 559; 712/220–222, 712/22, 24, 300, 225, 210; 708/5, 520, 523, 708/607, 622
See application file for complete search history.

(56) References Cited

U.S. PATENT DOCUMENTS 5,835,748 A * 11/1998 Orenstein et al. .......... 712/217

6,041,404 A * 3/2000 Roussel et al. ............. 712/210
6,145,077 A * 11/2000 Sidwell et al. ............. 712/300

FOREIGN PATENT DOCUMENTS

GB 1534230 11/1978

OTHER PUBLICATIONS

Sun Microsystems Inc. Technology White Paper: The UltraSPARC Architecture, Nov. 1995.*
Visual Instruction Set User's Guide, Mar. 1997.*
IBM Corporation, "ESA/390 Principles of Operation", 1993, Chapters 5 and 8.*
Sun Mircosystems, "Visual Instruction Set User's Guide", Mar. 1997.
Tri Media, "TM 1000 Preliminary Data Book", Phillips Electronics North America Corporation, 1997.
Wang, Mangasen, Srinivasan, "A Processor Architecture for 3D Graphics Calculations", Computer Motion Inc., Goleta, CA.
Abott, Massalin, Peterson, Karzes, Yamano, Kellogg, "Broadband Algorithms with the MicroUnity Mediaprocessor", Proceedings of Compcon, IEEE, 1996, pp. 349-354.
Advanced Micro Devices, Inc., "AMD-3D Technology Manual", Feb. 1998.

(Continued)

*Primary Examiner*—Kimbinh T. Nguyen
(74) *Attorney, Agent, or Firm*—Blakely, Sokoloff, Taylor & Zafman LLP

(57) ABSTRACT

An apparatus and method for performing an insert-extract operation on packed data using computer-implemented steps is described. In one embodiment, a first data operand having a data element is accessed. A second packed data operand having at least two data elements is then accessed. The data element in the first data operand is inserted into any destination field of a destination register, or alternatively, a data element is extracted from any field of the source register.

21 Claims, 7 Drawing Sheets

OTHER PUBLICATIONS

Hansen, Craig, "Architecture of a Broadband Mediaprocessor", Proceedings of Compcon, IEEE, 1996, pp. 334-340.

Hayes, Loyola, Abott, Massalin, "MicroUnity Software Development Environment", Proceedings of Compcon, IEEE, 1996, pp. 341-348.

Levinthal, Hanrahan, Paquette, Lawson, "Parallel Computers for Graphics Applications", Proceedings of: ASPLOS 11, IEEE, 1987, pp. 193-198.

Levinthal and Porter, "Chap-A SIMD Graphics Processor", Computer Graphics Project,, ACM, vol. 18, No. 3, Jul. 1984, pp. 77-81.

* cited by examiner

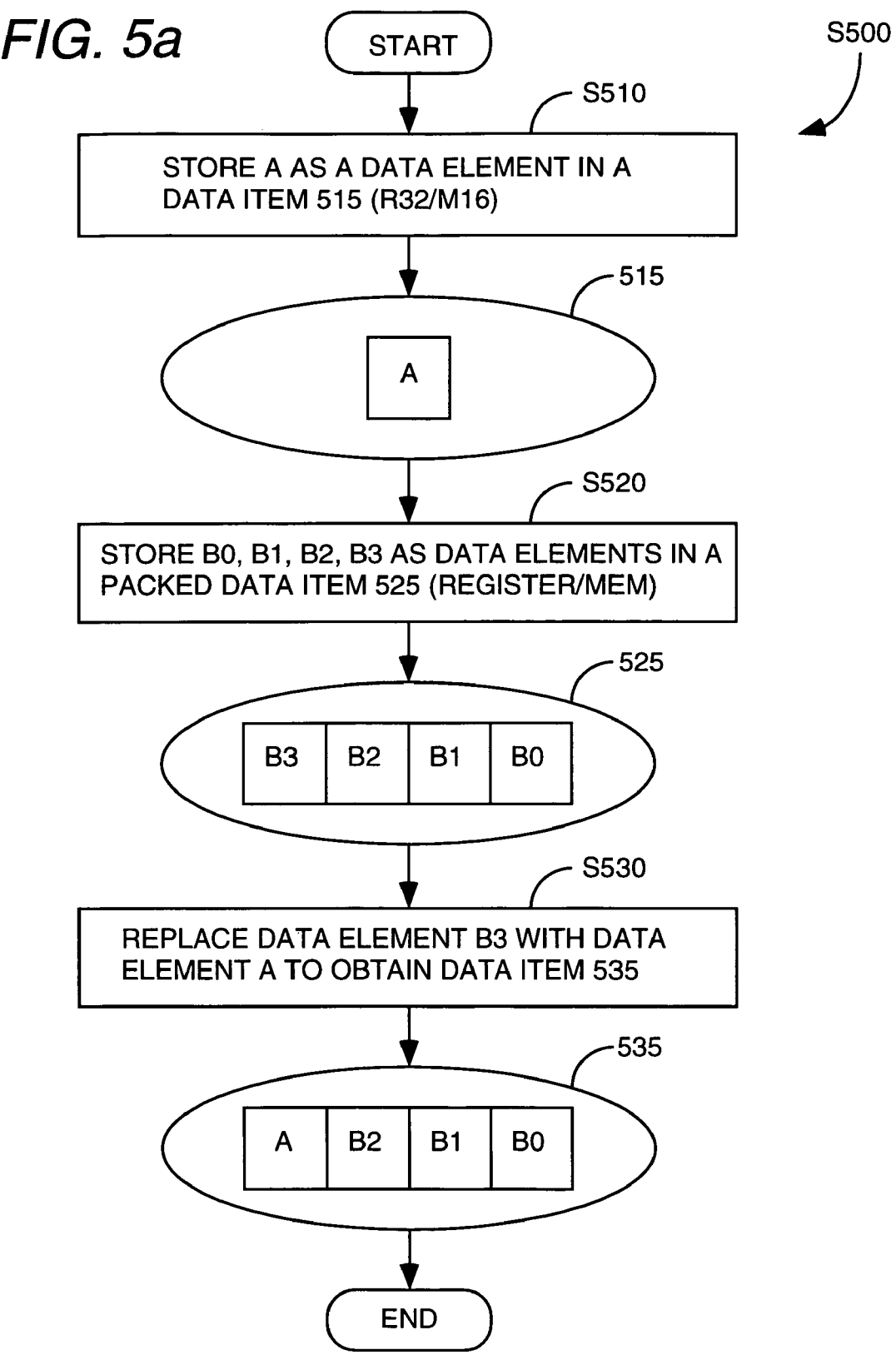

SYSTEM AND METHOD FOR PERFORMING AN INSERT-EXTRACT INSTRUCTION

FIELD OF THE INVENTION

The present invention relates in general to the field of computer systems, and in particular, to an apparatus and method for performing multi-dimensional computations based on an insert-extract operation.

BACKGROUND OF THE INVENTION

To improve the efficiency of multimedia applications, as well as other applications with similar characteristics, a Single Instruction, Multiple Data (SIMD) architecture has been implemented in computer systems to enable one instruction to operate on several operands simultaneously, rather than on a single operand. In particular, SIMD architectures take advantage of packing many data elements within one register or memory location. With parallel hardware execution, multiple operations can be performed with one instruction, resulting in significant performance improvement.

Although many applications currently in use can take advantage of such vertical operations, there are a number of important applications which would require the rearrangement of the data elements before vertical operations can be implemented so as to provide realization of the application. Examples of such important applications include the dot product and matrix multiplication operations, which are commonly used in 3-D graphics and signal processing applications.

Therefore, there is a need for providing an apparatus and method for efficiently performing vertical SIMD computations.

SUMMARY OF THE INVENTION

The present invention provides an apparatus and method for performing an insert-extract operation on packed data using computer-implemented steps is described. In one embodiment, a first data operand having a data element is accessed. A second packed data operand having at least two data elements is then accessed. The data element in the first data operand is inserted into any destination field of a destination register, or alternatively, a data element is extracted from any field of the source register.

BRIEF DESCRIPTION OF THE DRAWINGS

The present invention is illustrated by way of example and may be better understood by referring to the following description in conjunction with the accompanying drawings, in which like references indicate similar elements and in which:

FIGS. 5a and 5b illustrate the operation of the insert-extract instruction in accordance with one embodiment of the invention;

DETAILED DESCRIPTION OF A PREFERRED EMBODIMENT OF THE PRESENT INVENTION

In the following description, numerous specific details are set forth to provide a thorough understanding of the invention. However, it will be understood by one of ordinary skill in the art that the invention may be practiced without these specific details. In other instances, well-known circuits, structures and techniques have not been shown in detail in order not to obscure the invention.

According to one aspect of the invention, a method and apparatus are described for moving data elements into and out of a packed data operand (an insert-extract operation). The PINSRW and PEXTRW insert-extract instructions allow a user to insert or extract a word into or from any of the four 16-bit fields in a mm register or memory, which is 64 bits wide architecturally. The four fields consist of bits 63:48, 47:32, 31:16 and 15:0. Because there are four fields to select from, the first two bits of an immediate field imm are used to designate which position to either insert the 16-bit word into a register or memory, or extract from the 64 bit word into the lower 16-bit word of a register or memory.

The term "registers" is used herein to refer to the on-board processor storage locations that are used as part of macro-instructions to identify operands. In other words, the registers referred to herein are those that are visible from the outside of the processor (from a programmers perspective). However, the registers described herein can be implemented by circuitry within a processor using any number of different techniques, such as dedicated physical registers, dynamically allocated physical registers using register renaming, combinations of dedicated and dynamically allocated physical registers, etc.

Computer System

Figure 1:
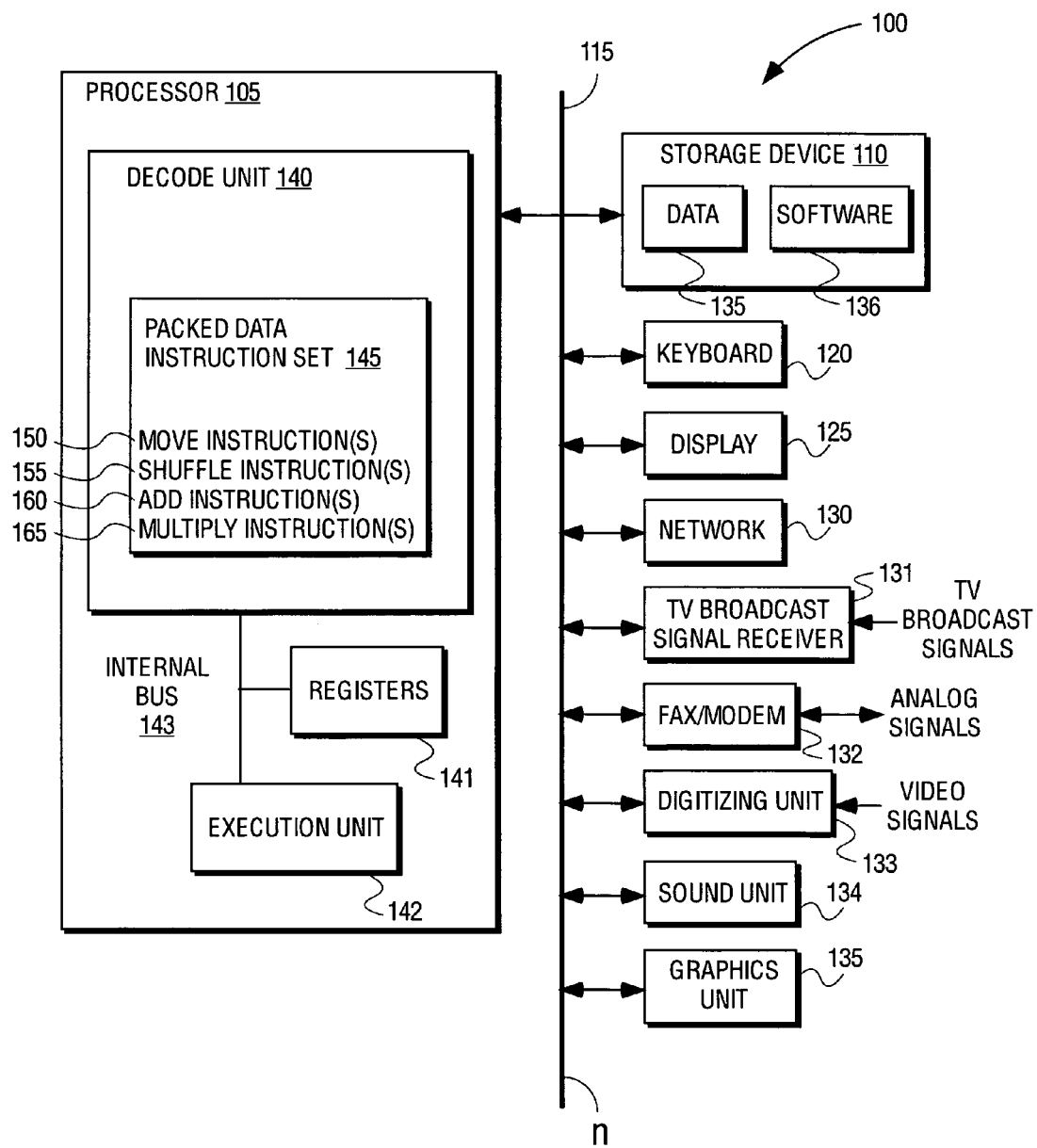
FIG. 1 illustrates an exemplary computer system in accordance with one embodiment of the invention.

FIG. 1 illustrates one embodiment of a computer system 100 which implements the principles of the present invention. Computer system 100 comprises a processor 105, a storage device 110, and a bus 115. The processor 105 is coupled to the storage device 110 by the bus 115. In addition, a number of user input/output devices, such as a keyboard 120 and a display 125, are also coupled to the bus 115. The processor 105 represents a central processing unit of any type of architecture, such as CISC, RISC, VLIW, or hybrid architecture. In addition, the processor 105 could be implemented on one or more chips. The storage device 110 represents one or more mechanisms for storing data. For example, the storage device 110 may include read only memory (ROM), random access memory (RAM), magnetic disk storage mediums, optical storage mediums, flash memory devices, and/or other machine-readable mediums. The bus 115 represents one or more buses (e.g., AGP, PCI, ISA, X-Bus, VESA, etc.) and bridges (also termed as bus controllers). While this embodiment is described in relation to a single processor computer system, the invention could be implemented in a multi-processor computer system. In addition, while this embodiment is described in relation to a 64-bit computer system, the invention is not limited to a 64-bit computer system.

In addition to other devices, one or more of a network 130, a TV broadcast signal receiver 131, a fax/modem 132, a digitizing unit 133, a sound unit 134, and a graphics unit 135 may optionally be coupled to bus 115. The network 130 and fax modem 132 represent one or more network connections for transmitting data over a machine readable media (e.g., carrier waves). The digitizing unit 133 represents one or more devices for digitizing images (i.e., a scanner, camera, etc.). The sound unit 134 represents one or more devices for inputting and/or outputting sound (e.g., microphones, speakers, magnetic storage devices, optical storage devices, etc.). The graphics unit 135 represents one or more devices for generating 3-D images (e.g., graphics card).

FIG. 1 also illustrates that the storage device 110 has stored therein data 135 and software 136. Data 135 represents data stored in one or more of the formats described herein. Software 136 represents the necessary code for performing any and/or all of the techniques described with reference to FIGS. 3–6. It will be recognized by one of ordinary skill in the art that the storage device 110 preferably contains additional software (not shown), which is not necessary to understanding the invention.

FIG. 1 additionally illustrates that the processor 105 includes decode unit 140, a set of registers 141, and execution unit 142, and an internal bus 143 for executing instructions. It will be recognized by one of ordinary skill in the art that the processor 105 contains additional circuitry, which is not necessary to understanding the invention. The decode unit 140, registers 141 and execution unit 142 are coupled together by internal bus 143. The decode unit 140 is used for decoding instructions received by processor 105 into control signals and/or microcode entry points. In response to these control signals and/or microcode entry points, the execution unit 142 performs the appropriate operations. The decode unit 140 may be implemented using any number of different mechanisms (e.g., a look-up table, a hardware implementation, a PLA, etc.). While the decoding of the various instructions is represented herein by a series of if/then statements, it is understood that the execution of an instruction does not require a serial processing of these if/then statements. Rather, any mechanism for logically performing this if/then processing is considered to be within the scope of the implementation of the invention.

The decode unit 140 is shown including packed data instruction set 145 for performing operations on packed data. In one embodiment, the packed data instruction set 145 includes the following instructions: a move instruction(s) 150, a shuffle instruction(s) 155, an add instruction(s) (such as ADDPS) 160, and a multiply instruction(s) 165. The MOVAPS, SHUFPS and ADDPS instructions are applicable to packed floating point data, in which the results of an operation between two sets of numbers having a predetermined number of bits, are stored in a register having the same predetermined number of bits, i.e., the size or configuration of the operand is the same as that of the result register. The operation of each of these instructions is further described herein. While one embodiment is described in which the packed data instructions operate on floating point data, alternative embodiments could alternatively or additionally have similar instructions that operate on integer data.

In addition to the packed data instructions, processor 105 can include new instructions and/or instructions similar to or the same as those found in existing general purpose processors. For example, in one embodiment the processor 105 supports an instruction set which is compatible with the Intel® Architecture instruction set used by existing processors, such as the Pentium® II processor. Alternative embodiments of the invention may contain more or less, as well as different, packed data instructions and still utilize the teachings of the invention.

The registers 141 represent a storage are on processor 105 for storing information, including control/status information, integer data, floating point data, and packed data. It will be understood by one of ordinary skill in the art that one aspect of the invention is the described instruction set for operating on packed data. According to this aspect of the invention, the storage area used for storing the packed data is not critical. The term data processing system is used herein to refer to any machine for processing data, including the computer systems(s) described with reference to FIG. 1.

While one embodiment of the invention is described in which the processor 105, executing the packed data instructions operates on 128-bit packed data operands containing four 32-bit single precision floating point values, can operate on packed data in several different packed data formats. For example, in one embodiment, packed data can be operated on in one of three formats: a "packed byte" format (e.g., PADDb), a "packed word" format (e.g., PADDw), or a "packed double word" (dword) format (e.g., PADDd). The packed byte format includes eight separate 8-bit data elements; the packed word format includes four separate 16-bit data elements; the packed dword format includes two separate 32-bit data elements 16-bit data elements. While certain instructions are discussed below with reference to one or two packed data formats, the instructions may be similarly applied the other packed data formats of the invention.

Figure 2:
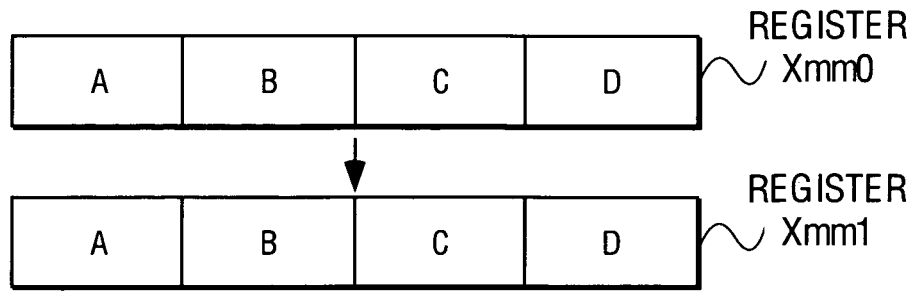
FIG. 2 illustrates the operation of the move instruction in accordance with one embodiment of the invention.

The shuffle instruction of the present invention is part of a family of many different instructions which operate with SIMD architecture. For example, FIG. 2 illustrates the operation of the move instruction 150 according to one embodiment of the invention. In this example, the move instruction 150 (MOVAPS) moves bits of data from one register to another register or from one memory location to another. In one embodiment, 64-bits representing four packed words from one memory location to another or from one register to another.

Figure 3:
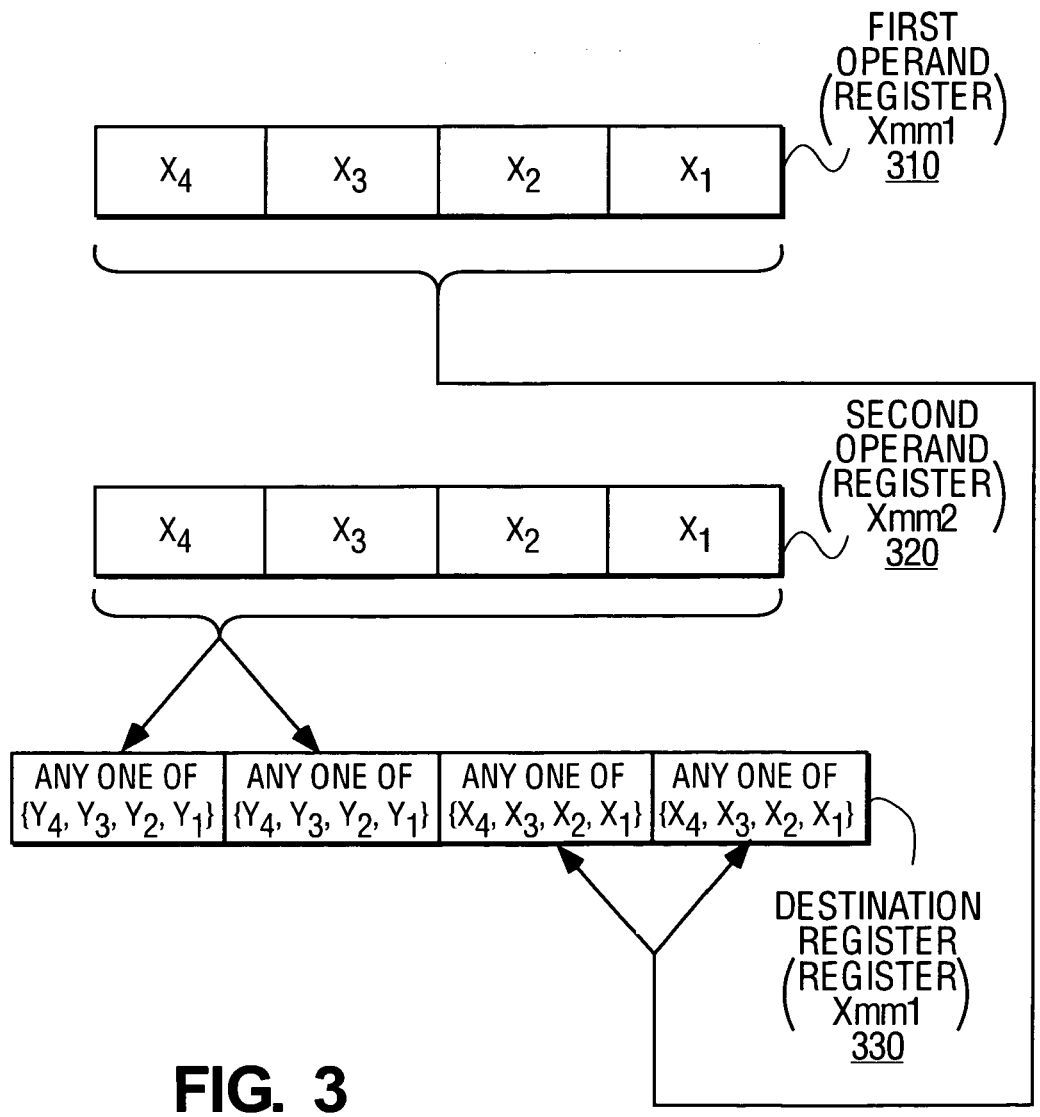
FIG. 3 illustrates the operation of the shuffle instruction in accordance with one embodiment of the invention.

FIG. 3 illustrates the operation of the shuffle instruction 155 according to one embodiment of the invention. In one embodiment, the shuffle instruction 155 (SHUFPS) is able to shuffle any one of a plurality (e.g., four) single floating point (FP) numbers from a first operand 310 to the lower two destination fields of a destination register 330; the upper two destination fields are generated from a shuffle of any one of a plurality (e.g., four) single FP numbers from a second operand 320.

Figure 4:
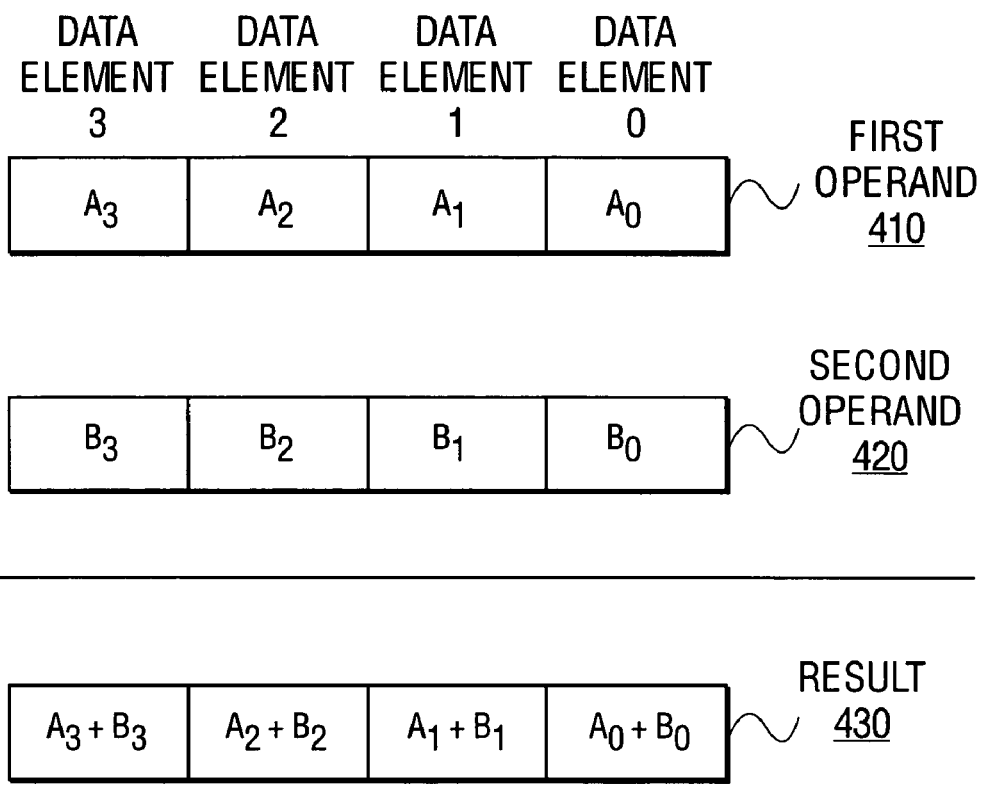
FIG. 4 illustrates the operation of the inter-add instruction in accordance with one embodiment of the invention.

FIG. 4 illustrates the operation of the packed vertical add instruction 160 according to one embodiment of the invention. In one embodiment, the packed vertical operation is the add instruction (ADDPS) 160, which operates on the data elements of a first to operand 410 and a second operand 420. In particular, the data elements of a first operand 410 are added to the respective packed data elements of a second operand 420, and are used to generate a result 430. For example, data element 0 of the first operand 410 is added to data element 0 of the second operand 420 and the result is stored as data element 0 of the result 430. The packed multiply instruction acts in a similar manner to the packed add instruction, except multiply operations are performed.

Insert-Extract Operations

FIG. 5a illustrates a technique for performing a PINSRW operation on two numbers according to one embodiment of the invention. In this application, data is represented by ovals, while instructions are represented by rectangles. Beginning from a start state, the process S500 proceeds to process step S510, where a number A is stored as a data element in a data item 515. For present discussion purposes, the data element is 16-bits wide.

The process S500 then proceeds to process step S520, where numbers B0, B1, B2 and B3 are stored as data elements in a packed data item 525. For present discussion purposes, each data element is 16-bits wide, and the operand to be inserted into is contained in register X, in the following order:

|B3|B2|B1|B0|

A 2-bit immediate value is used as a specifier field to indicate how data elements should be inserted. The two bits of the specifier field indicate which of the four data elements in the data operand are inserted into. For the purpose of explanation along with the example shown in FIG. 5a, an immediate value of 11 is used.

It will be recognized by one of ordinary skill in the art that the size of the insert specifier field may vary depending on the number of fields in the destination register. For example, with only a two field destination register, a one bit specifier field is sufficient to indicate how the data should be inserted.

The process S500 then advances to process step S530, where a PINSRW instruction is performed on the contents of the memory element (data item 515) and register X (data item 525) and immediate value 11, so as to replace data item B3 with A. The resulting data item 535 stored in register X is as follows:

|A|B2|B1|B0|

Accordingly, a PINSRW operation is performed. Although FIG. 5a illustrates an example of the PINSRW operation with data operands having four data elements, the principles of the invention may also be implemented in data operands having at least two elements.

Figure 5B:
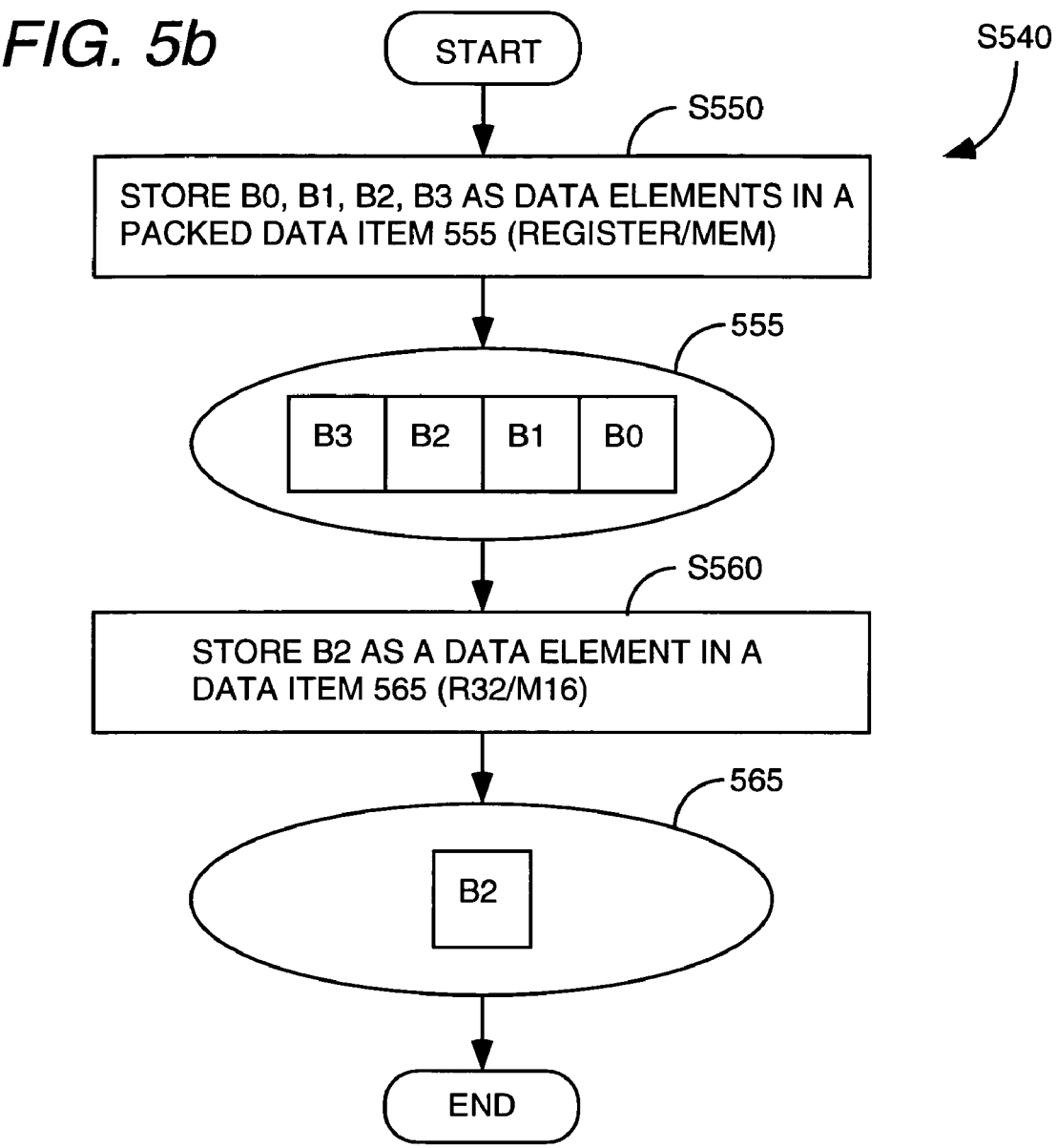

FIG. 5b illustrates a technique for performing a PEXTRW operation on two numbers according to one embodiment of the invention. Data is once again represented by ovals, while instructions are represented by rectangles. Beginning from a start state, the process S540 proceeds to process step S550, where numbers B0, B1, B2 and B3 are stored as data elements in a packed data item 555. For present discussion purposes, each data element is 16-bits wide, and the operand to be inserted into is contained in register X, in the following order:

|B3|B2|B1|B0|

A 2-bit immediate value is used as a specifier field to indicate how data elements should be extracted. The two bits of the specifier field indicate which of the four data elements in the data operand are extracted from. For the purpose of explanation along with the example shown in FIG. 5b, an immediate value of 10 is used.

It will be recognized by one of ordinary skill in the art that the size of the extract specifier field may vary depending on the number of data elements in the source data operand. For example, with only a two element source register, a one bit specifier field is sufficient to indicate how the data should be extracted.

The process S500 then advances to process step S560, where a PEXTRW instruction is performed on the contents of register X (data item 555) and immediate value 10, so as to extract data item B2. The resulting data item 565 contains the value of B2.

Accordingly, a PEXTRW operation is performed. Although FIG. 5b illustrates an example of the PEXTRW operation with data operands having four data elements, the principles of the invention may also be implemented in data operands having at least two elements.

Figure 6:
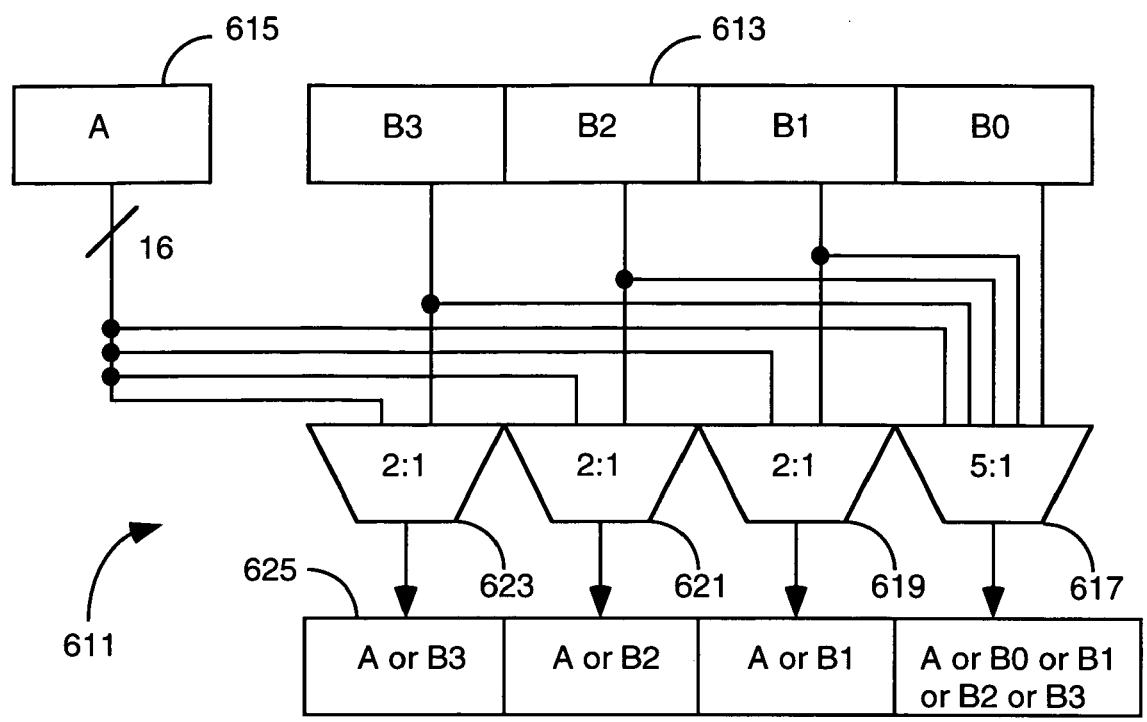
FIG. 6 illustrates the operation of the insert-extract instruction in accordance with one embodiment of the invention.

FIG. 6 illustrates a schematic for performing an insert operation on two numbers according to one embodiment of the invention. The device 611 takes the contents of a first source data operand 615 and a second source packed data operand 613. A five to one data multiplexer 617 inserts any one of data elements {A} or {B3,B2,B1,B0} from either data operands 613, 615 into the first field of destination data item 625. A two to one data multiplexer 619 inserts either of data elements {A} or {B1} from either data operands 613, 615 into the second field of destination data item 625. A two to one data multiplexer 621 inserts either of data elements {A} or {B2} from either data operands 613, 615 into the third field of destination data item 625. A two to one data multiplexer 623 inserts either of data elements {A} or {B3} from either data operands 613, 615 into the fourth field of destination data item 625.

Accordingly, an insert operation is performed. Although FIG. 6 illustrates an example of the insert-extract operation with data operands having four data elements, the principles of the invention may also be implemented in data operands having at least two elements.

Figure 7:
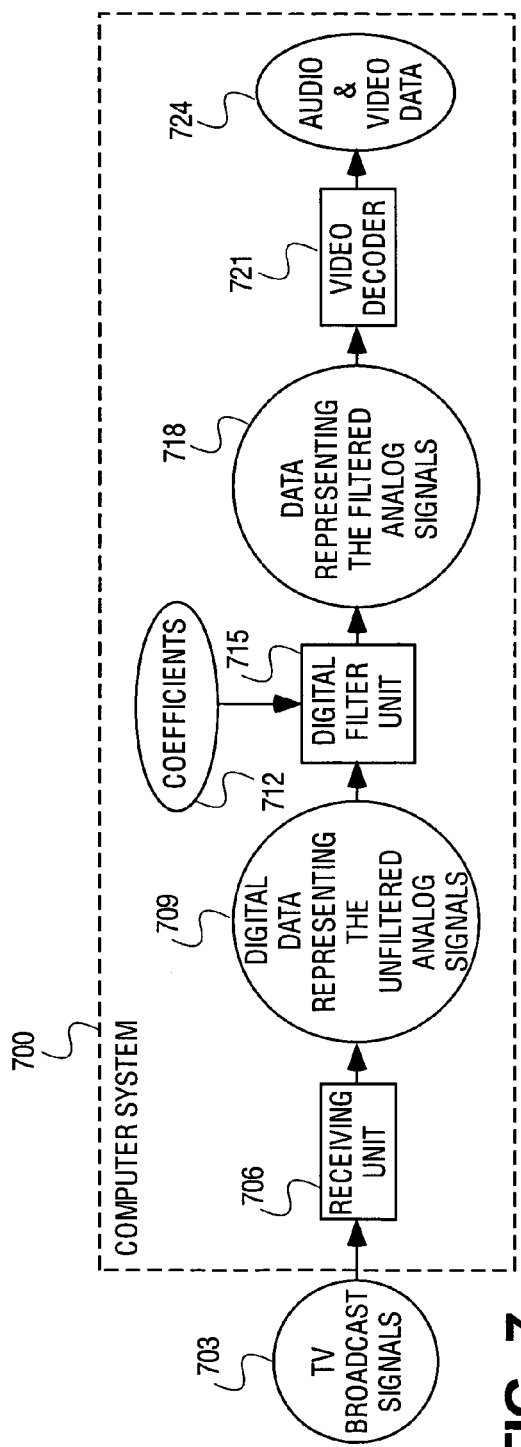
FIG. 7 is a general block diagram illustrating the usage of a digital filter which utilizes insert-extract operations, for filtering a TV broadcast signal in accordance with one embodiment of the invention.

The insert-extract instruction of the present invention may be used as part of many different applications. For example, FIG. 7 is a general block diagram illustrating the use of a digital filter which utilizes an insert-extract operation for filtering a TV broadcast signal according to one embodiment of the invention. FIG. 7 shows TV broadcast signals 703 representing a television broadcast being received by a receiving unit 706 of a computer system 700. The receiving unit 706 receives the TV broadcast signals 703 and transforms them into digital data 709. A digital filter unit 715 performs a digital filter (e.g., FIR, IIR, etc.) on the digital data 709 using a set of coefficients 712. As a result, the digital filter unit 715 generates filtered data 718 (also termed as "filtered data items") representing the filtered analog TV broadcast signals. In performing the filtering operation, insert-extract operations is implemented. The filtered data 718 is received by a video decoder 721 for conversion into and audio & video data 724. The techniques performed by video decoder 721 are well known (see Jack, Smith, Keith, "NTSC/PAL Digital Decoder", *Video Demystified*, High Text Publications, Inc., 1993) The audio and video data can be used for any purpose (e.g., display on a screen).

In one embodiment, the computer system 100 shown in FIG. 1 is used to implement the computer system 700 in FIG. 7. In this embodiment, the TV broadcast signal receiver 131 acts as the receiving unit 706 and may include a TV tuner, an analog to digital converter, and a DMA channel. The TV broadcast signals 703 are received by the TV tuner, converted into digital data by the analog to digital converter, and then sorted in the storage device 110 by the DMA channel. It will be recognized by one of ordinary skill in the art that the digital data sorted by the TV broadcast signal receiver 131 may be stored in any number of formats. For example, the TV broadcast signal receiver 131 may store the data in the main memory in one or more of the formats described herein—storing two representations of each of the components of the data such that it may be read in as packed data item in the described formats. This data may then be accessed as packed data and copied into registers on the processor 105. Since the data is stored in the disclosed formats, the processor 105 can easily and efficiently perform the insert-extract operation as described with reference to FIG. 5 and FIG. 6. It will be recognized by one of ordinary skill in the art that the receiving unit 706 may encompass additional hardware, software, and/or firmware in the TV broadcast signal receiver 131 or software executing on the processor 105. For example, additional software may be sorted in the storage device 110 for further processing the data prior to the digital filter being performed.

In this embodiment, the digital filter unit 718 is implemented using the processor 105 and the software 136 to perform the a digital filter. In this embodiment, the processor 105, executing the software 136, performs the digital filter using insert-extract operations, and stores the filtered data 718 in storage device 110. In this manner, the digital filter is performed by the host processor of the computer system, rather than the TV broadcast signal receiver 131. As a result, the complexity of the TV broadcast signal receiver 131 is reduced. In this embodiment, the video decoder 721 may be implemented in any number of different combinations of hardware, software, and/or firmware. The audio and video data 724 can then be sorted, and/or displayed on the display 125 and the sound unit 134, respectively.

Figure 8:
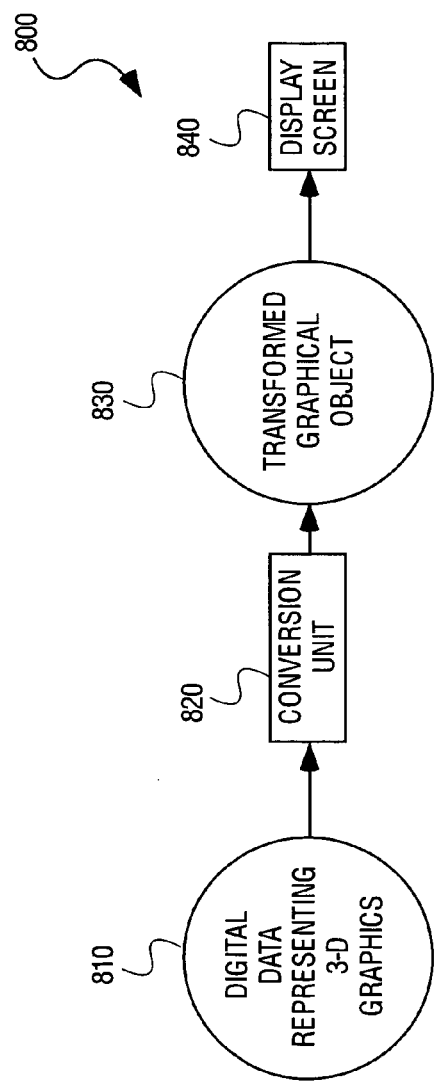
FIG. 8 is a general block diagram illustrating the use of insert-extract operations, in rendering graphical objects in animation.

FIG. 8 is a general block diagram illustrating the use of an insert-extract operation for rendering graphical objects in animation according to one embodiment of the invention. FIG. 8 shows a computer system 800 containing digital data 755 representing 3-dimensional (3D) graphics. The digital data 810 may be stored on a CD ROM or other type of storage device for later use. At sometime, the conversion unit 760 performs alteration of data using 3D geometry which includes the use of an insert-extract operation to manipulate (e.g., scale, rotate, etc.) a 3D object in providing animation. The resulting graphical object 830 is then displayed on a screen display 840. The resulting graphical object may also be transmitted to a recording device (e.g., magnetic storage, such as tape).

In one embodiment, the computer system 100 shown in FIG. 1 is used to perform the 30 graphics operation 800 from FIG. 8. In this embodiment, the digital data 810 from FIG. 8 is any data stored in the storage device 110 representing 3D graphics. In one embodiment, the conversion unit 820 from FIG. 8 is implemented using the processor 105 and the software 136 to alter data using 3D geometry. An example of such alteration of data includes the performance of a 3D transformation. In this embodiment, the processor 105, executing the software 136, performs the transformation and stores the transformed data 830 in the storage device 110 and/or provide, the transformed data to the graphics unit 135. In this manner, the 3D manipulation performed by the host processor of the computer system is provided at an increased speed. The present invention thus facilitates the performance of an insert-extract operation through the use of available instruction sequences.

While several examples uses of insert-extract operations have been described, it will be understood by one of ordinary skill in the art that the invention is not limited to these uses. In addition, while the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. A computer system comprising:
   a hardware unit to transmit data representing graphics to another computer or a display;
   a processor coupled to the hardware unit; and
   a storage device coupled to the processor and having stored therein a routine, which when executing by the processor, causes the processor to generate the data, the routine at least causing the processor to at least,
      access a first data operand having a data element;
      access a second packed data operand having at least two data elements;
      insert the data element in the first data operand into a destination field of a destination register, wherein the storage device further comprises a packing device for packing integer data into the data elements.

2. The computer system of claim 1 wherein the storage device further comprises a packing device for packing floating point data into the data elements.

3. A computer system comprising:
   a hardware unit to transmit data representing graphics to another computer or a display;
   a processor coupled to the hardware unit; and
   a storage device coupled to the processor and having stored therein a routine, which when executing by the processor, causes the processor to generate the data, the routine at least causing the processor to at least,
      access a first packed data operand having at least two data elements; and
      extract one of the data elements from the first packed data operand into a field of a destination register, while preserving other data elements in the first packed data operand.

4. The computer system of claim 3 wherein the storage device further causes the processor to extract one of the data elements from the first packed data operand into a field of a packed destination register.

5. The computer system of claim 3 wherein the storage device further comprises a packing device for packing floating point data into the data elements.

6. The computer system of claim 3 wherein the storage device further comprises a packing device for packing integer data into the data elements.

7. A method comprising the computer-implemented operations that include:
   decoding a single instruction;
   in response to decoding the single instruction,
      accessing a first data operand having a data element;
      accessing a second packed data operand having at least two data elements;
      inserting the data element in the first data operand into a destination field of a destination register, including packing integer data into the data elements.

8. The method of claim 7 further comprising:
   packing floating point data into the data elements.

9. A method comprising the computer-implemented operations of:
   decoding a single instruction;
   in response to decoding the single instruction,
      accessing a first packed data operand having at least two data elements; and
      extracting one of the data elements from the first packed data operand into a field of a destination register, while reserving other data elements in the first packed data operand.

10. The method of claim 9 wherein extracting one of the data elements from the first packed operand comprises extracting one of the data elements from the first packed data operand into a field of a packed destination register.

11. The method of claim 9 further comprising packing floating point data into the data elements.

12. The method of claim 9 further comprising packing integer data into the data elements.

13. A method comprising the computer implemented operations of:
   accessing data representative of a first three-dimensional image;
   altering the data using three-dimensional geometry to generate a second three-dimensional image, altering at least including,
   accessing a first data operand having a data element;
   accessing a second packed data operand having at least two data elements;
   inserting the data element in the first data operand into a destination field of a destination register; and
   displaying the second three-dimensional image.

14. The method of claim 13 wherein altering includes the performance of a three-dimensional transformation.

15. The method of claim 13 wherein altering includes packing floating point data into the data elements.

16. The method of claim 13 wherein altering includes packing integer data into the data elements.

17. A method comprising the computer implemented operations of:
   accessing data representative of a first three-dimensional image;
   altering the data using three-dimensional geometry to generate a second three-dimensional image, at least including,
   accessing a first packed data operand having at least two data elements; and
   extracting one of the data elements from the first packed data operand into a field of a destination register; and
   displaying the second three-dimensional image.

18. The method of claim 17 wherein altering further includes extracting one of the data elements from the first packed data operand into a field of a packed destination register.

19. The method of claim 17 wherein altering includes the performance of a three-dimensional transformation.

20. The method of claim 17 wherein altering includes packing floating point data into the data elements.

21. The method of claim 17 wherein altering includes packing integer data into the data elements.

* * * * *